United States Patent [19]
Granger et al.

[11] Patent Number: 6,116,527
[45] Date of Patent: Sep. 12, 2000

[54] CENTER-PIVOT IRRIGATION RUT PREVENTION DEVICE

[76] Inventors: Ed W. Granger, Box 49, Gracemont, Okla. 73042; Donald L. Rose, 2317 NW. 109th St., Oklahoma City, Okla. 73120

[21] Appl. No.: 09/327,437

[22] Filed: Jun. 8, 1999

[51] Int. Cl.[7] ........................................... B05B 3/18
[52] U.S. Cl. .............................. 239/728; 239/722
[58] Field of Search ................... 239/722, 726, 239/728–731

[56] References Cited

U.S. PATENT DOCUMENTS

| | | | |
|---|---|---|---|
| 3,669,355 | 6/1972 | Jurgens | 239/730 |
| 4,059,911 | 11/1977 | Bean et al. | |
| 4,192,388 | 3/1980 | Goebel | 239/726 X |
| 4,209,068 | 6/1980 | Corsentino | 239/726 X |
| 5,421,514 | 6/1995 | McKenry | 239/728 X |
| 5,435,495 | 7/1995 | Davis | 239/726 X |

*Primary Examiner*—Lesley D. Morris
*Attorney, Agent, or Firm*—Randal D. Homburg

[57] ABSTRACT

The invention is a device for installation in a conventional center-pivot irrigation system commonly found in agriculture which prevents ruts caused by the movement of the wheels in the drive mechanism of the irrigation system by re-directing the flow of water from the front of the drive mechanism of the irrigation system to the rear of the system thus enabling the wheels of the drive mechanism to travel of dry soil instead of freshly irrigated soil in the field. The invention consists of water pipe, quick connect attachments, a reciprocating sprinkler head, support struts and connecting ports for the drop lines supplied by the center-pivot irrigation system nearest the drive mechanism of the irrigation system.

4 Claims, 5 Drawing Sheets

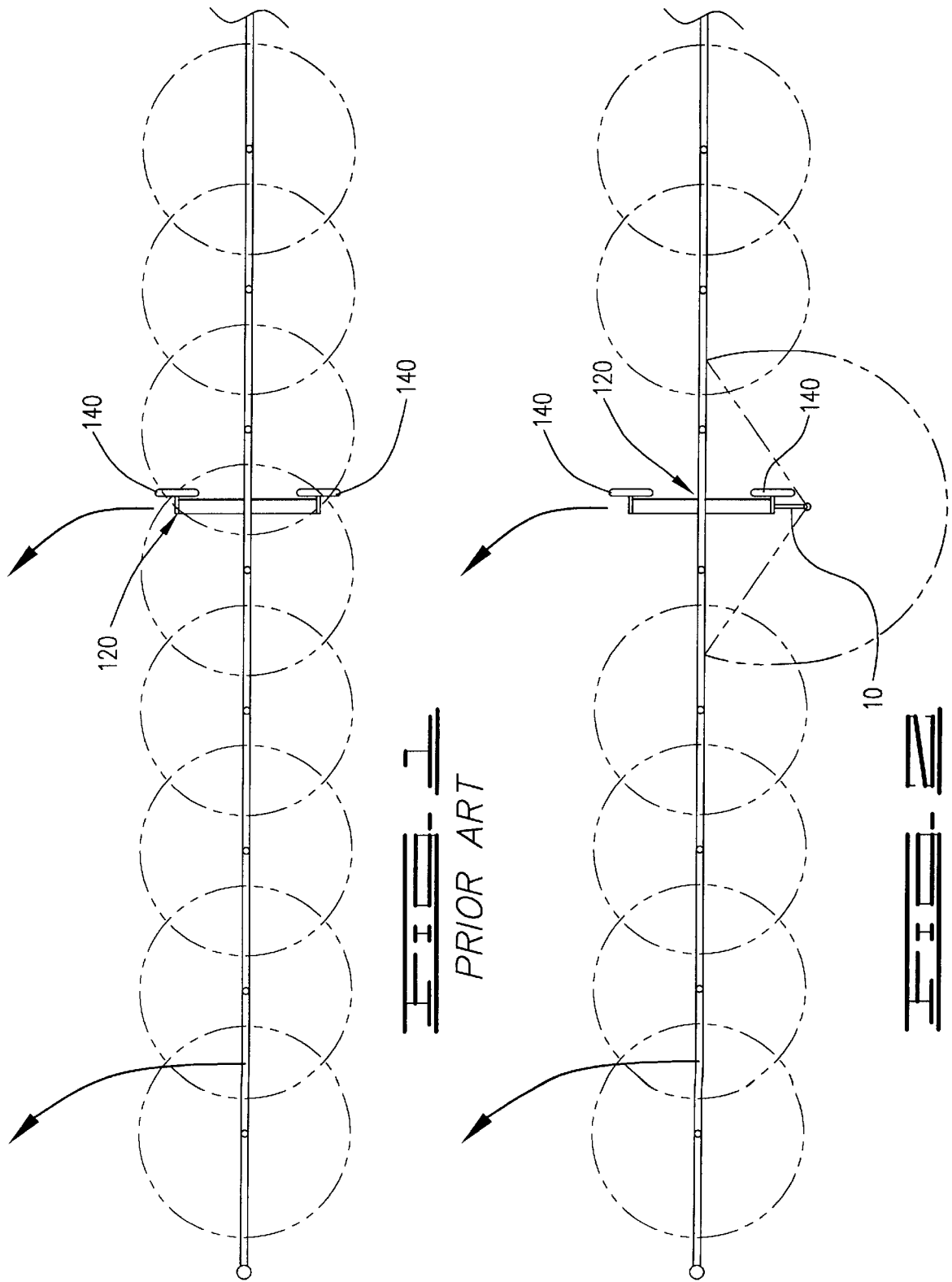

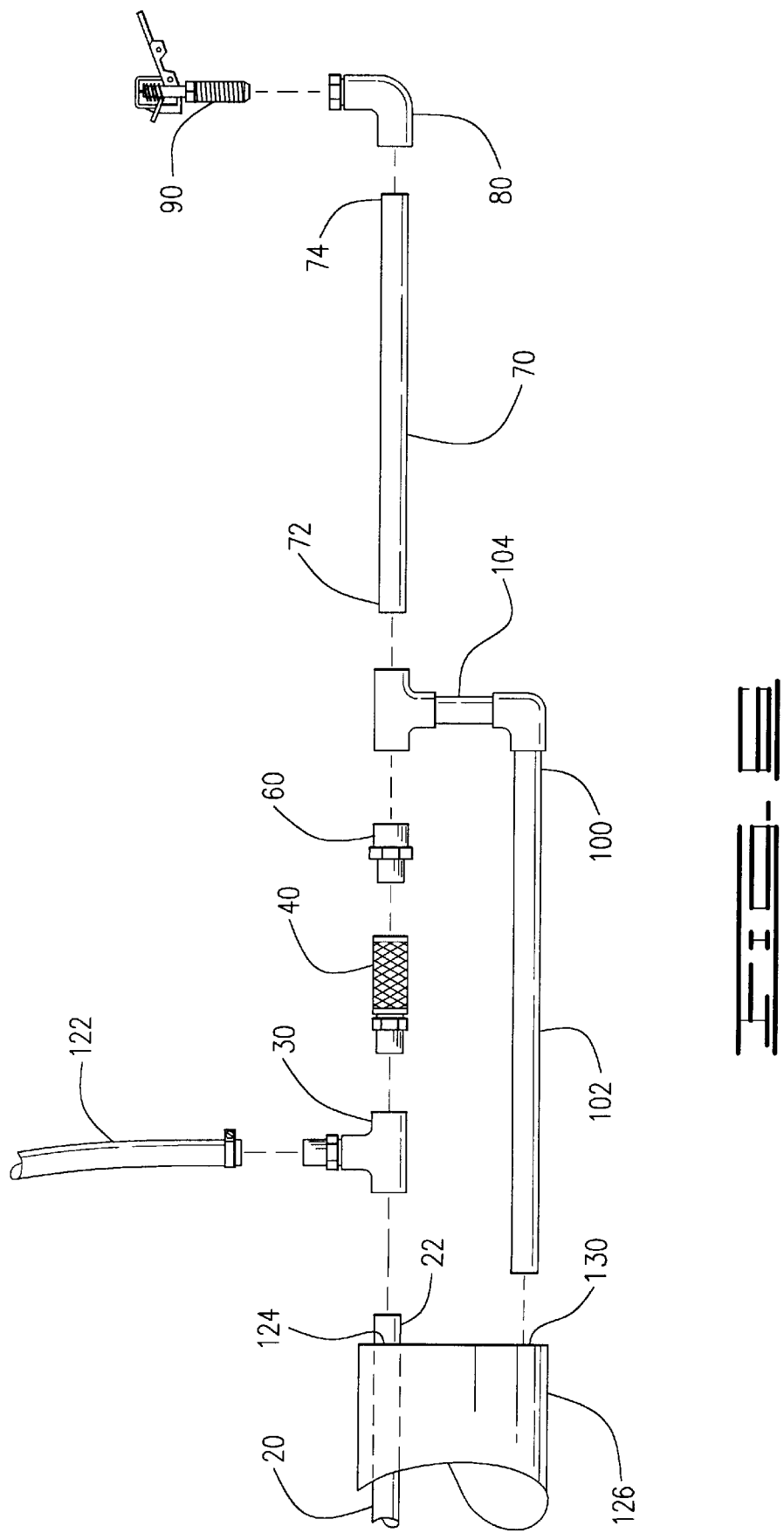

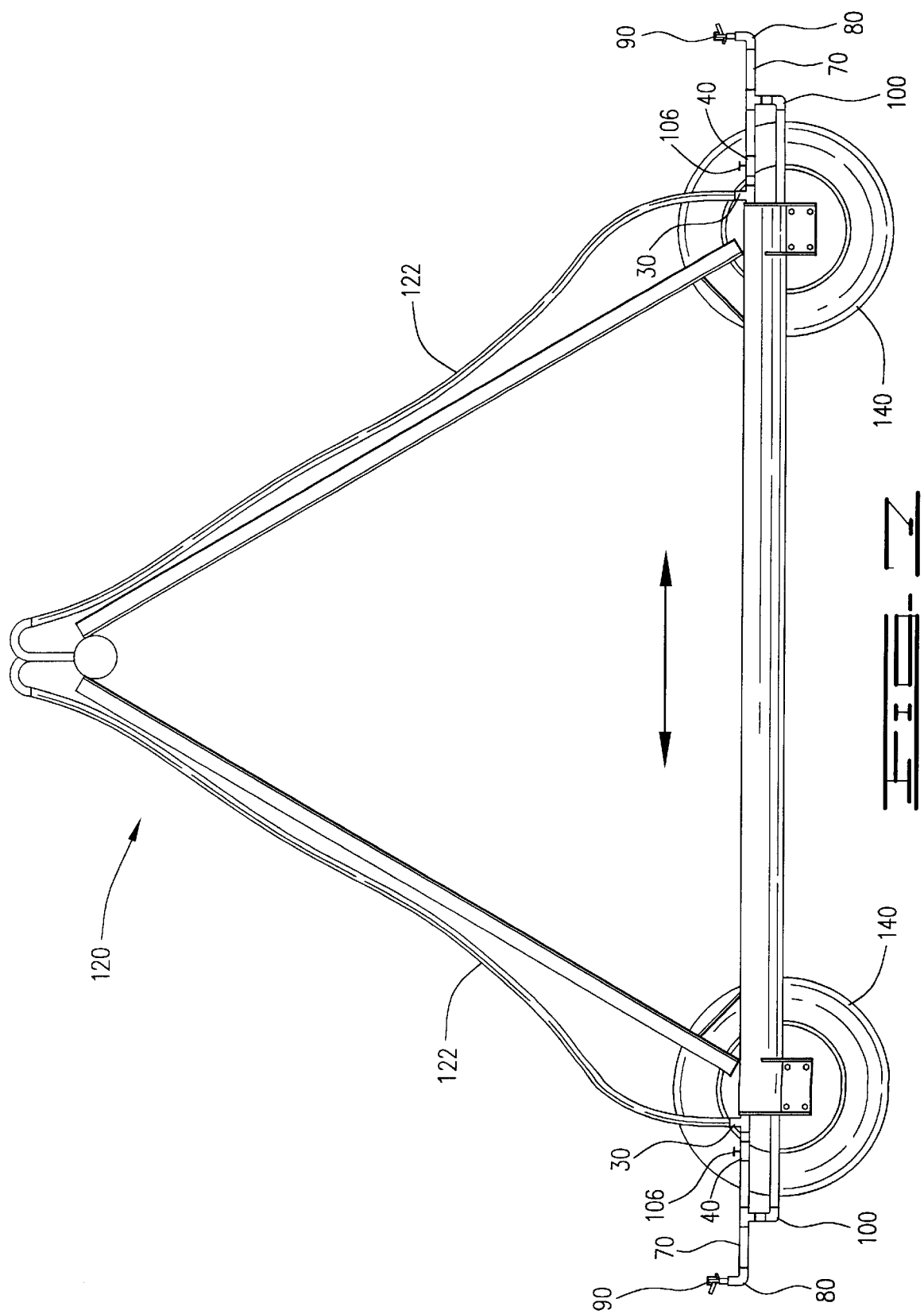

CENTER-PIVOT IRRIGATION RUT PREVENTION DEVICE

CROSS REFERENCE TO RELATED APPLICATIONS

None.

I. BACKGROUND OF INVENTION

1. Field of the Invention

The invention is a device for installation on a conventional center-pivot irrigation system commonly utilized in agriculture which eliminates ruts caused by the movement of the wheels in the drive mechanism of the irrigation system on wet soil by re-directing the flow of water from the front of the drive mechanism of the irrigation system to the rear of the system, thus enabling the wheels of the drive mechanism to travel of dry soil instead of freshly irrigated soil in the field. The invention consists of water pipe, quick connect attachments, a reciprocating sprinkler head, support struts and connecting ports for the drop lines supplied by the center-pivot irrigation system nearest the drive mechanism of the irrigation system.

2. Description of Prior Art

Numerous patents currently exist in the known art dealing with center-pivot irrigation systems used for agricultural purposes. However, none of them appear to address the problem encountered by use of the large scale devices which have either a motor driven or a water driven mechanism where the wheel of the drive mechanism are caused to travel over freshly irrigated soil, causing the weight of the irrigation system to leave ruts in the soil which impede future harvests or future irrigation. This device reduces the problem described above by redirecting the water from the front of the irrigation system and placing a controlled amount at the rear of the movement of the irrigation system, and can be retrofitted to nearly all existing center-pivot irrigation devices with little or no modification.

In a search of prior art, the following patents are disclosed and incorporated by reference into this utility patent application. In U.S. Pat. No. 4,365,749 to Bowen, a center-pivot irrigation system is disclosed which include a central water pipe, a center-pivot and wheels which transport the water pipe in a circular pattern around the center pivot. U.S. Pat. No. 4,674,681 to Meis discloses a center-pivot irrigation device suited for irrigating non-circular fields. U.S. Pat. No. 4,365,748 to Emrich discloses a center-pivot irrigation system that is self-driven. In U.S. Pat. Nos. 4,240,582 to Anderson and 4,161,292 to Holloway, center-pivot irrigation systems suited for watering corners are disclosed. U.S. Pat. No. 3,999,569 to Linder discloses a center-pivot irrigation system and device which has adjustable ground contact elements for traveling in a precise circular pattern.

U.S. Pat. No. 4,369,922 to Vikre discloses a sprinkler head for mounting on a center-pivot irrigation system. In U.S. Pat. Nos. 4,191,331 to Bivens and 4,728,040 to Healy, stream reversing directors and sprinkler deflectors are disclosed for attachment to sprinkler systems. A rotary irrigation spray device is disclosed in U.S. Pat. No. 4,611,760 to Koresh. A controlled irrigation attachment made from a plastic bottle is disclosed in U.S. Pat. No. 4,141,477 to Hengesbach.

II. SUMMARY OF THE INVENTION

This invention is an after-market component system added to a conventional center-pivot irrigation system commonly utilized in large scale agricultural operations for irrigating crops in the field. It may be incorporated into nearly all center-pivot irrigation systems utilizing the elements already on the irrigation systems. The invention includes a rigid water line, quick-connect ends for engaging a reciprocating sprinkler attachment, fixed support struts, and at least one T-junction suited for connecting to the irrigation lines of the irrigation system closest to the drive mechanism of the irrigation system. The invention is connected to the rear of the irrigation system and directs the water that would normally be placed in a circular pattern around the irrigation line, both in front of and behind the path of the irrigation system. The water is redirected to the reciprocating spray component only behind the path of the irrigation system, thus preventing irrigation of the path of the irrigation system ahead of the drive mechanism and preventing the drive mechanism from traveling over freshly irrigated wet soil. This eliminates the potential for ruts in the field which undermine the efficient harvest of the crops and create sometimes dangerous and hazardous problems in future cultivation and soil management.

III. DESCRIPTION OF THE DRAWINGS

The following drawings are submitted with this utility patent application.

FIG. 1 is a drawing of the conventional center-pivot irrigation system and it's conventional spray pattern in prior art.

FIG. 2 is a drawing a center-pivot irrigation system with the invention installed demonstrating it's modified spray pattern.

FIG. 6 is a side view of the uninstalled invention's unassembled components.

FIG. 7 is a side drawing of another embodiment of the invention installed on a conventional center-pivot irrigation system.

IV. DESCRIPTION OF THE PREFERRED EMBODIMENT

Figure 3:
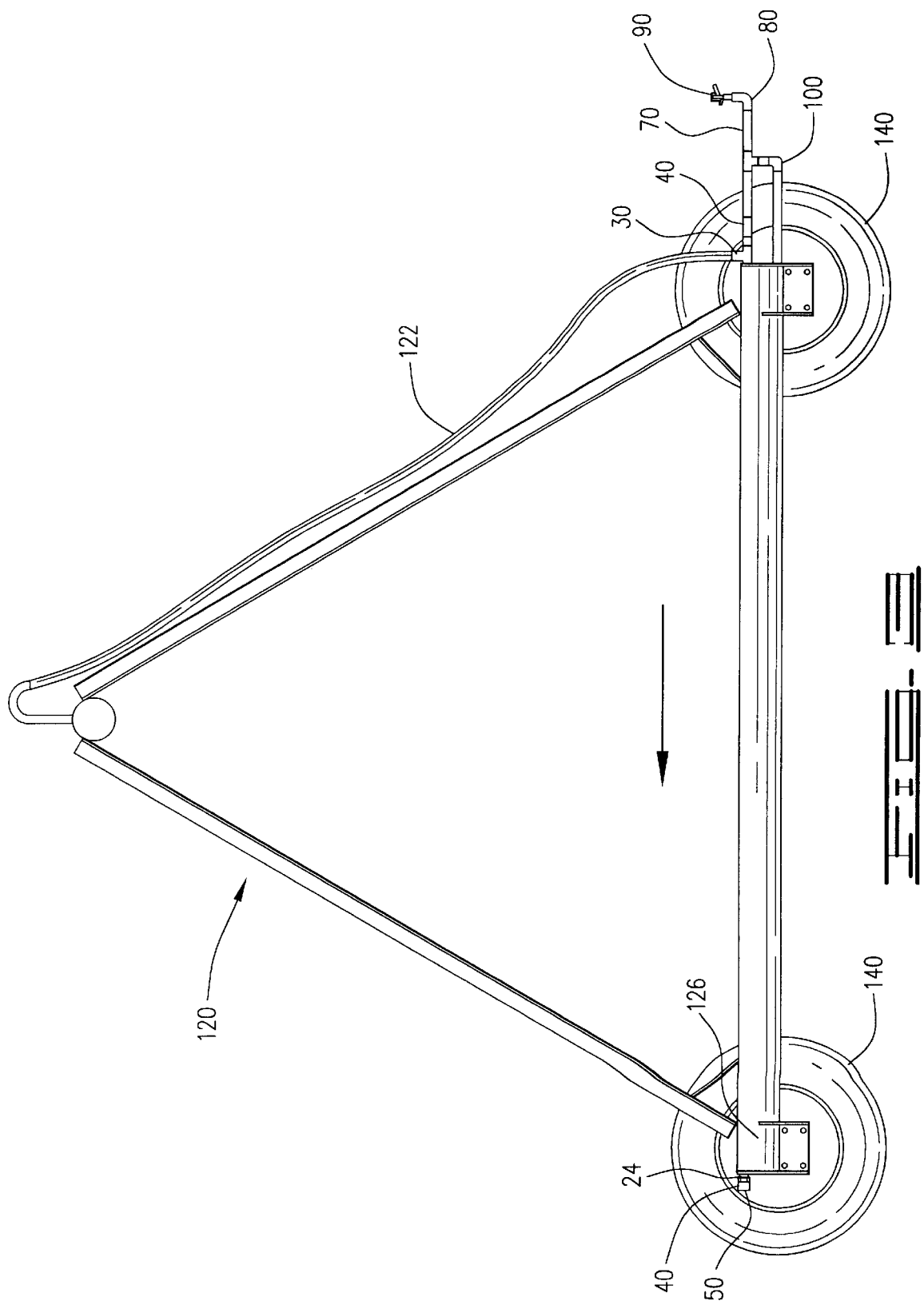
FIG. 3 is a side drawing of the invention installed on a conventional center-pivot irrigation system drive mechanism.
Figure 4:
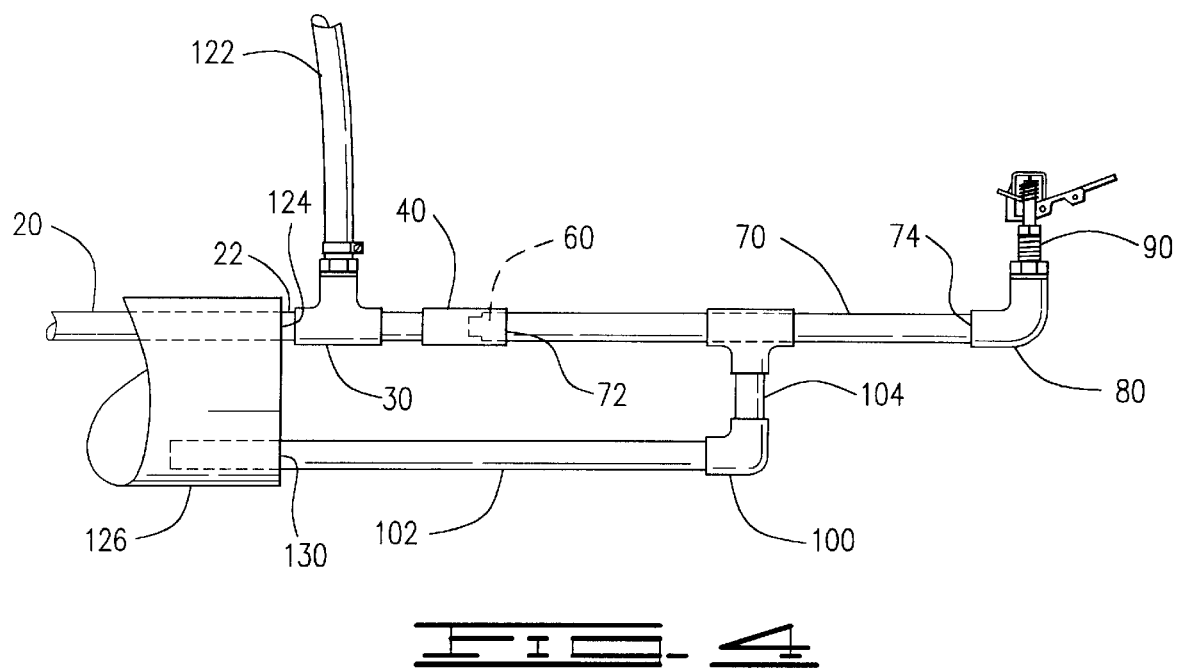
FIG. 4 is a side view of the invention installed on the rear of a conventional center-pivot irrigation system drive mechanism.
Figure 5:
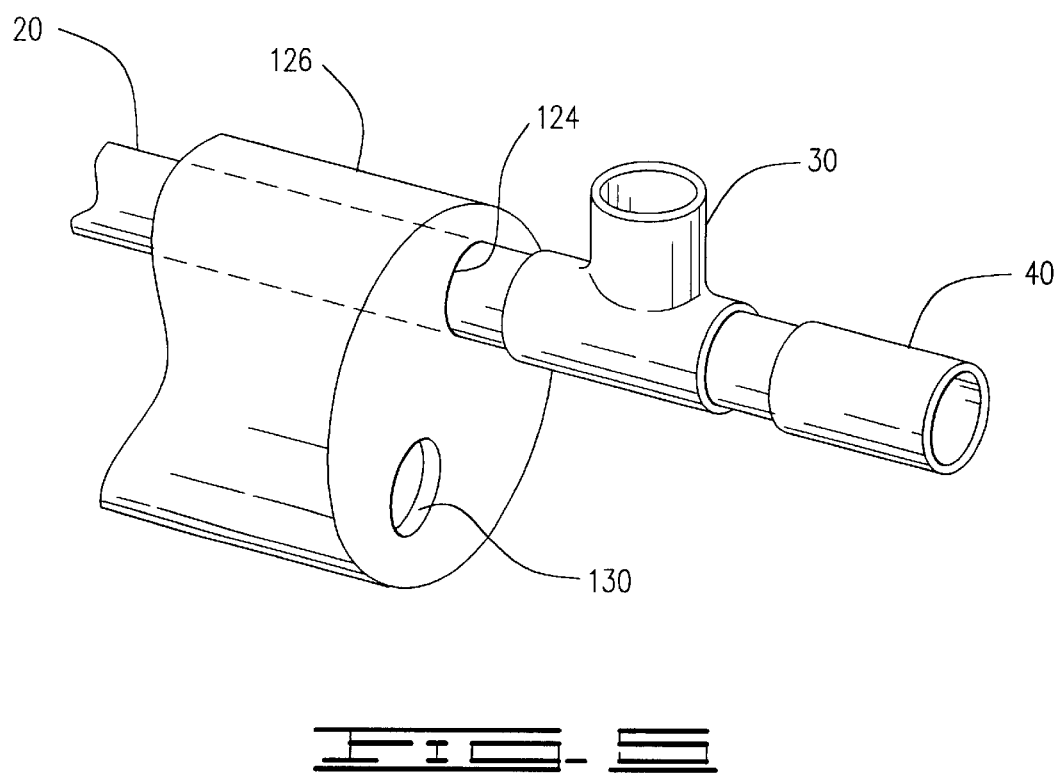
FIG. 5 is a side view of one of the embodiments of the invention on the front of a conventional center-pivot irrigation system with the spray apparatus detached.

The invention is a device for use with a conventional large-scale center-pivot irrigation system 120 to eliminate wheel ruts in the field caused by the drive wheels 140 of such irrigation devices traveling through freshly irrigated soil. The invention 10, as shown in FIGS. 2–6 of the drawings, comprises a length of rigid primary water line 20 having a first end 22 and a second end 24, at least one T-connection 30 on one of the two ends 22,24 of the primary water line 20 to which a descending water line 122 from the center-pivot irrigation system 120, is attached, two female quick connections 40 fitted to the primary water line 20 and the T-connection 30, a male quick connection cap 50 applied to the female quick connection 40 at the forward direction of the irrigation system, a male quick connection 60 fitted to a first end 72 of a secondary water line 70 inserted into the other female quick connection 40, a ninety degree elbow 80 attached in an upright position to the secondary water line at a second end 74 on the secondary water line 70, a reciprocating sprinkler head 90 affixed to the ninety degree elbow 80, the sprinkler head 90 having an adjustable spray pattern and adjustable water flow, and an L-shaped support strut 100 having a horizontal length 102 and a vertical length 104, connected to the secondary water line 70 for vertical support and additional horizontal support.

In the preferred embodiment, as demonstrated in FIGS. 2–5 of the drawings, the length of primary water line 20 is inserted through pre-drilled holes 124 in the drive wheel housing 126 of the irrigation system 120 perpendicular to the length of the irrigation system with which the invention 10 is utilized. If there are no pre-drilled holes 124 in the drive wheel housing 126, holes are drilled in the drive wheel housing 126 and the primary water line 20 is inserted through such holes. The primary water line 20 extends beyond both sides of the drive wheel housing 124. A T-connection 30 is fastened to the first end 22 of the primary water line 20. A female quick connection 40 is then fastened to the second end 24 of the primary water line 20. The second female quick connection 40 is attached to the T-connection 30. If two T-connections 30 are used, as in a more preferred embodiment, T-connections 30 are respectively attached to the first end 22 and second end 24 of the primary water line 20 and a female quick connection 40 is fastened to each T-connection 30. A descending water line 122 from the center-pivot irrigation system closest to the drive wheel housing 124 is connected to the T-connection 30 or connected to each T-connection 30, depending upon which embodiment of the invention 10 is being utilized. The above components constitute the permanent attachments of the invention to the center-pivot irrigation system.

The following components are removeable spraying components. The male quick connection cap 50 is applied to the female quick connection 40 coinciding with the front end of the center-pivot irrigation system 120 relative to the direction the system travels. The male quick connection 60 fastened to a first end 72 of the secondary water line 70 is applied to the female quick connection 40 coinciding with the rear end 128 of the center-pivot irrigation system 124 relative to the direction the system travels. At the opposing second end 74 of the secondary water line 70, the ninety degree elbow 80 is attached in an upright position. Attached to the ninety degree elbow 80 is the reciprocating sprinkler head 90 having an adjustable spray pattern and water flow is attached. The L-shaped support strut 100 is affixed to the secondary water line 70 at the vertical length 104 of the support strut 100, with the horizontal length 102 parallel to the primary water line 20. The horizontal length 102 of the L-shaped support strut 100 is inserted into a second pre-drilled hole 130 in the drive-wheel housing 126 of the center-pivot irrigation system. If no such second pre-drilled hole 130 exists in the drive-wheel housing 126 of the center-pivot irrigation system 120, holes should be drilled into the drive wheel housing 126 to accommodate the horizontal length 102 of the L-shaped support strut 100. The components of the invention may be made of PVC material for ease of installation and assembly.

Most center-pivot irrigation systems are directionally reversible. The invention should always spray in the direction behind the travel of the center-pivot irrigation system 120, as shown in FIG. 2 of the drawings. Once the permanent components are installed in the system, the detachable portion of the invention may be quickly disconnected and moved to the other end of the irrigation system so that when the irrigation system reverses direction, the invention directs the water behind the irrigation system, thus allowing the wheel of the irrigation system to travel on relatively dry and firm soil as opposed to wet and muddy soil where the wheels would leave ruts in the soil, as demonstrated in FIG. 1 of the drawings.

In yet another preferred embodiment, the invention is provided with dual removable spray components affixed to both female quick connections 40 of the primary water line 20 at the drive wheel portion of the irrigation system. A means 106 of selecting which of the two provided reciprocating sprinkler heads 90 is active and which is dormant is provided, allowing only one sprinkler head 90 to be active at one time. Such means 106 could include a valve which directs water flow in one direction and closes the flow to the other direction.

While the invention has been particularly shown and described with reference to a preferred embodiment thereof, it will be understood by those skilled in the art that changes in form and detail may be made therein without departing from the spirit and scope of the invention.

What is claimed is:

1. A device for use with a conventional, large-scale, center-pivot irrigation systems having a wheel housing descending water lines and drive wheels to eliminate wheel ruts in the field caused by the drive wheels of the irrigation system comprising:

a) a length of rigid primary water line, having a first end and a second end, the rigid primary water line inserted through a first set of horizontally aligned first holes in the drive wheel housing of the center-pivot irrigation system extending beyond the wheel housing;

b) a T-connection attached to the first end of the primary water line;

c) a first and second female quick connections respectively connected to the T-connection and the second end of the primary water line;

d) a male quick connection cap inserted into the second female quick connection;

e) a male quick connection inserted into the first female quick connection;

f) a secondary water line attached to the male quick connection at a first secondary water line end and having a second secondary water line end;

g) an L-shaped support strut connected to and descending from the secondary water line at a vertical end of the support strut, the support strut having a horizontal end parallel to the secondary water line, the horizontal end inserted into a second hole in the drive wheel housing of the irrigation system, such second hole positioned below one of the first holes in the drive wheel housing;

h) a 90 degree elbow attached to the second secondary water line end in a upright position;

i) a reciprocating sprinkler head attached to the 90 degree elbow, such sprinkler head having an adjustable spray pattern and water flow; and j) the T-connection is connected to a descending water line situated closest to the drive wheel housing, wherein the sprinkler head of the invention is connected to the end coinciding with the first female quick connection located at the rear of the direction of travel of the irrigation system and the water which would normally be sprayed in front of the wheels of the center-pivot irrigation system is directed only to the rear of the travel of the center-pivot irrigation system, thus eliminating the ruts created by the drive wheels of the irrigation system traveling through freshly irrigated soil and mud.

2. The invention as described in claim 1 wherein the components of the invention are PVC pipe.

3. The invention as described in claim 1, further comprising a second T-connection attached to the primary water line, thereby providing the invention with two T-connections for attaching more descending water lines.

4. The invention as described in claim 1, further comprising:
   a) a second T-connection attached to the second end of the primary water line, thereby providing the invention with two T-connections;
   b) a second male quick connection in place of the male quick connection cap;
   c) a second secondary water line connected to the second male quick connection;
   d) a second L-shaped support strut affixed to the second secondary water line;
   e) the second secondary water line attached to a second 90 degree elbow;
   f) a second reciprocating sprinkler head attached in an upright position to the 90 degree elbow; and
   g) a valve placed in the primary water line between the two T-connections to direct water flow to only one sprinkler head at a time.

* * * * *